No. 731,454.

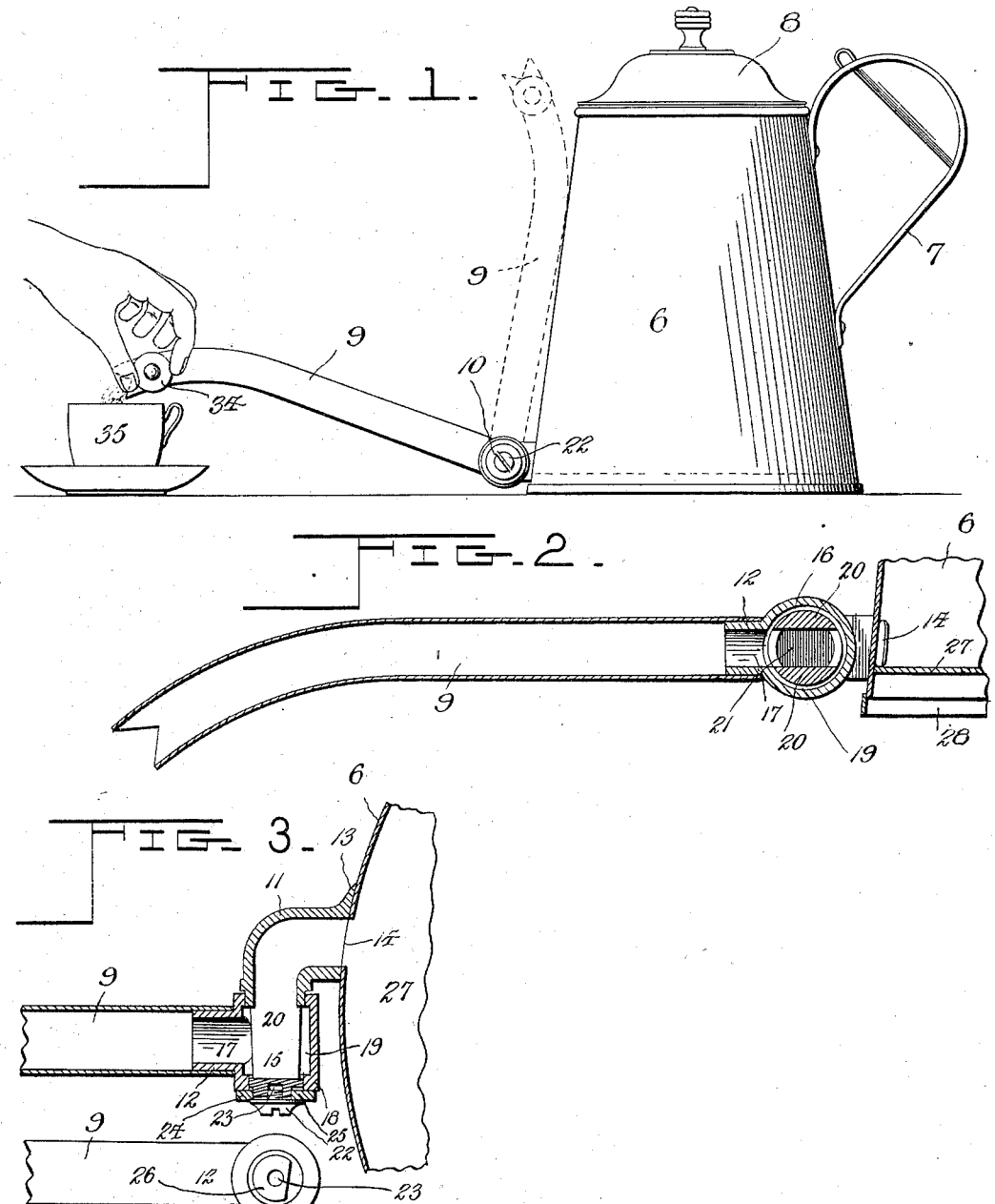

Patented June 23, 1903.

UNITED STATES PATENT OFFICE.

HAROLD WOLFERSTAN HIGGINS, OF MONTREAL, CANADA.

COFFEE-POT.

SPECIFICATION forming part of Letters Patent No. 731,454, dated June 23, 1903.

Application filed April 3, 1902. Serial No. 101,280. (No model.)

*To all whom it may concern:*

Be it known that I, HAROLD WOLFERSTAN HIGGINS, a subject of His Majesty the King of Great Britain, residing in the city and district of Montreal, Province of Quebec, Canada, have invented certain new and useful Improvements in Coffee-Pots; and I do hereby declare that the following is a full, clear, and exact description of the invention, such as will enable others skilled in the art to which it appertains to make and use the same.

My invention relates to coffee and tea pots of that class in which is employed a pivoted spout adapted to be turned down when it is desired to obtain a portion of the contents of the pot, thus avoiding the necessity of lifting the pot; and the present invention has for its object, among others, to provide an improved construction of this character whereby the manufacture and assemblage of the parts are facilitated and, further, to provide means for proper adjustment of the joint and to compensate for wear.

The novel features will be particularly pointed out in the appended claims.

I have shown my invention in the accompanying drawings, wherein—

Figure 1 is a side elevation of my improved pot, showing the operation of pouring the beverage therefrom. Fig. 2 is a longitudinal central vertical section through the spout and lower portion of the coffee-pot. Fig. 3 is a horizontal section through the center of the joint. Fig. 4 is a side elevation of the joint, showing the cap-screw removed.

The same numerals of reference denote like parts in each of the several figures of the drawings.

The pot itself is denoted by the numeral 6, and it has a handle 7 and a cover or lid 8 of the ordinary pattern. The spout 9 is of the ordinary tubular shape; but instead of being fixed at its lower end to the lower end of the pot it is connected therewith by an intermediate pivot-joint 10, which is of peculiar construction. This joint consists of two members 11 and 12, the first of which consists of a tubular elbow joined at its base to the side of the pot 6 at the lower portion thereof, as shown at 13, the pot being provided with an aperture 14 in the side to permit the exit of the beverage therefrom. At its other end the member 11 is provided with a tapered nipple 15, having its exterior face 16 neatly ground to form a conical seat, which is adapted to coact with a conical bore formed transversely in the member 12, this member being of T shape, having its longitudinal branch 17 connected with the lower end of the spout 9, as shown in Fig. 3. The transverse portion of the T, forming the head 18 of the member 12, has the conical seat therein above mentioned, and this conical seat is divided into two portions by a central chamber 19, the inner face of the head 18 of the member 12 being recessed to form this chamber around the central portion of the nipple 15. The two ends of the nipple are connected by segmental portions 20, which leave a slot or open space 21 between them, thus enabling the interior or tube of the member 11 to communicate at all times with the interior of the member 12, and hence with the tube of the spout 9.

In order to provide for the proper adjustment of the friction of the joint 10, the bore of the head 18 of the member 12 is formed slightly smaller than the exterior surface of the nipple 15, whereby it may be pushed over the same to the amount necessary to secure the desired tension by means of a cap-screw 22, which is screwed into a socket 23 in the end of the nipple 15, and in order to prevent the cap-screw 22 from being turned by the raising and lowering of the spout I have placed between them a washer 24, having a segmental flattened or keyed portion 25 thereon, this washer being adapted to be seated on a similarly-formed boss 26, formed on the end of the nipple, whereby the washer 24 is held solidly fixed to the end of the nipple 15 and prevented from turning. In order to tighten the spout 9 to the requisite degree, it is then simply necessary to turn the screw 22, thus forcing the member 12 farther up on the conical seat of the nipple 15.

In order to prevent a portion of the beverage from settling at the bottom of the pot and to enable all to be drawn out through the spout, I provide the bottom 27 of the pot in a raised position—that is to say, the side has a depending flange 28 below said bottom—so that the upper surface of said bottom is adapted to be level with or slightly above the lower portion of the entrance-way 14 to the spout.

At the end of the spout 9 I provide a handle-knob 34, which projects laterally and is preferably formed of insulating material, whereby the same may be grasped and moved in either direction without danger of burning the hand.

When it is desired to pour coffee from the pot, the handle-knob 34 will be grasped in the manner shown in Fig. 1 and simply turned downwardly, whereby the coffee or other beverage will flow into the cup 35, placed beneath to receive it, and when the cup is filled the spout may then be returned into its upper position resting against the side of the pot, as shown in the dotted line.

Having thus described my invention, what I claim as new, and desire to secure by Letters Patent, is—

1. A vessel for hot beverages comprising a pot provided at its side with an aperture, a tubular elbow having its base surrounding said aperture and its other end having tapered nipple, a coöperating T-shaped member having connection with a spout and a transverse portion forming a head with central chamber, segmental portions connecting the ends of said nipple and leaving an open space between them, a cap-screw engaged in a socket in the end of said nipple and a washer interposed between said cap-screw and head and held against turning, all substantially as shown and described.

2. A vessel for hot beverages comprising a pot provided at its side with an aperture, a tubular elbow joined at its base to said pot around said aperture and provided at its other end with a tapered nipple, a coöperating member of T shape having longitudinal branch for connection with a spout and a transverse portion forming a head having a conical seat divided into two parts by a central chamber, segmental portions connecting the two ends of said nipple leaving an open space between them, the bore of the head of said coöperating member being slightly smaller than the exterior surface of the nipple, a cap-screw engaged in a socket in the end of said nipple, a washer interposed between said cap-screw and head and having segmental flattened portion fitting a similarly-shaped boss on the end of the nipple, all substantially as herein shown and described.

In witness whereof I have hereunto set my hand in the presence of two witnesses.

HAROLD WOLFERSTAN HIGGINS.

Witnesses:
GEORGE W. COLLES,
T. MYNARD.